United States Patent
Werth

[11] Patent Number: 5,925,322
[45] Date of Patent: Jul. 20, 1999

[54] FUEL CELL OR A PARTIAL OXIDATION REACTOR OR A HEAT ENGINE AND AN OXYGEN-ENRICHING DEVICE AND METHOD THEREFOR

[75] Inventor: John Werth, Princeton, N.J.

[73] Assignee: H Power Corporation, Belleville, N.J.

[21] Appl. No.: 08/896,669

[22] Filed: Jul. 18, 1997

Related U.S. Application Data

[63] Continuation of application No. 08/548,704, Oct. 26, 1995, abandoned.

[51] Int. Cl.[6] .................................................. B01D 50/00
[52] U.S. Cl. ...................... 422/170; 422/177; 422/187; 422/188; 422/190; 422/191; 429/17; 429/19; 429/20; 429/24; 429/26; 205/343; 205/349; 205/633; 205/634; 55/338; 55/343; 55/318; 55/385.1; 55/385.2; 60/205; 60/207; 60/297; 60/311; 96/121; 96/122; 96/126; 96/134; 96/143; 96/146
[58] Field of Search ................................ 429/13, 17, 19, 429/24, 26, 20; 422/187, 188, 189, 190, 191, 168, 170, 177; 55/343, 388, 339, 340, 318, 315, 385.1, 385.2, 385.3; 60/205, 207, 722, 645, 297, 311; 95/47, 54, 87, 128, 130, 138, 139, 223; 96/121, 122, 123, 126, 127, 134, 146, 143; 205/343, 349, 633, 634

[56] References Cited

U.S. PATENT DOCUMENTS

| | | | |
|---|---|---|---|
| 4,026,680 | 5/1977 | Collins | 55/26 |
| 4,315,893 | 2/1982 | McCallister | 422/187 |
| 4,702,903 | 10/1987 | Keefer | 422/187 |
| 4,806,136 | 2/1989 | Kiersz et al. | 62/18 |
| 4,971,606 | 11/1990 | Sircar et al. | 55/25 |
| 4,988,580 | 1/1991 | Ohsaki et al. | 429/19 |
| 5,169,415 | 12/1992 | Roettger et al. | 205/633 |
| 5,174,866 | 12/1992 | Chen et al. | 205/634 |
| 5,175,061 | 12/1992 | Hildebraunt et al. | 429/17 |
| 5,425,240 | 6/1995 | Jain et al. | 96/126 |
| 5,478,534 | 12/1995 | Louise et al. | 422/188 |
| 5,709,791 | 1/1998 | Hibino et al. | 205/340 |
| 5,795,370 | 8/1998 | Garrett et al. | 96/130 |
| 5,837,125 | 11/1998 | Prasad et al. | 205/763 |
| 5,846,295 | 12/1998 | Kalbassi et al. | 95/139 |

*Primary Examiner*—Bruce F. Bell
*Attorney, Agent, or Firm*—Salzman & Levy

[57] ABSTRACT

The present invention relates to a combined cycle system of enhanced efficiency. The system comprises a top stage, such as a fuel cell, a partial oxidation reactor or a heat engine, and an oxygen-enriching device, such as a temperature swing adsorption device or a chemical reactor bed device, as its bottom stage. The bottom stage uses waste heat produced by the top stage to enrich the oxygen content of air that is inputted to the bottom stage, thereby producing an oxygen-enriched gas mixture as the bottom stage output. This output mixture constitutes a superior oxidant which is fed back as an input for the top stage, thus enhancing the energy conversion efficiency, cheapness, and compactness of the combined cycle system as compared to that of ordinary fuel cells, partial oxidation reactors and heat engines that use unenriched air as their oxidant input.

19 Claims, 3 Drawing Sheets

FUEL CELL OR A PARTIAL OXIDATION REACTOR OR A HEAT ENGINE AND AN OXYGEN-ENRICHING DEVICE AND METHOD THEREFOR

This is a continuation of application Ser. No. 548,704 filed on Oct. 26, 1995, now abandoned.

FIELD OF THE INVENTION

This invention relates generally to a fuel cell, partial oxidation reactor or heat engine system and, more specifically, to a combined cycle system having a fuel cell, partial oxidation reactor or heat engine as a top stage and an oxygen-enriching device as a bottom stage. The oxygen-enriching device uses the waste heat from the top stage to produce an oxygen-enriched gas mixture which is fed to the top stage to significantly raise the efficiency of the combined cycle system.

DESCRIPTION OF THE PRIOR ART

In the past, various techniques were developed to separate out oxygen from air. For example, oxygen separation from air was usually done by pressure swing adsorption or by air liquefaction.

U.S. Pat. No. 4,026,680 discloses an adiabatic pressure swing system for air separation by selective adsorption in at least two zeolitic molecular sieve beds.

U.S. Pat. No. 4,806,136 discloses an air separation method employing compression powered by a gas turbine and employing four heat regenerable adsorbent purifiers to separate the feed air into nitrogen rich gas and oxygen-enriched liquid.

Both of these technology schemes consume considerable amounts of energy, thus making them impractical for such applications as fuel cells, partial oxidation reformers, or heat engines. However, running the aforementioned devices on an oxygen-enriched gas mixture instead of air would, but for the energy drain required for separation, be quite beneficial. For example, the fuel cell's efficiency, weight, size and cost would all improve if an oxygen-enriched gas mixture were used instead of air. A partial oxidation reformer would also be more efficient, smaller, lighter and cheaper if it could use an oxygen-enriched gas mixture instead of air. Furthermore, the output of the partial oxidation reformer would contain less nitrogen, thereby making a better fuel source, i.e., a more concentrated fuel, for a fuel cell or an iron oxide reduction bed. A heat engine running on an oxygen-enriched gas mixture would also be more efficient. The heat engine would also be more environmentally sound in that a heat engine running on an oxygen-enriched gas mixture would generate considerably less nitrogen oxide pollution than one running on air.

Therefore, a need existed to provide improved energy conversion using an oxygen-enriched mixture. A novel combined cycle system has a bottom stage (i.e., oxygen-enriching stage) that, when uniquely combined with the top stage, provides considerably more efficiency than current fuel cells, partial oxidation reactors and heat engines. This will make it fuel efficient to run the top stage on the oxygen-enriched gas mixture produced by the bottom oxygen-enriching stage. The combined cycle system of this invention requires a smaller energy drain for oxygen enrichment than the corresponding energy drain created by current apparatuses and methods.

SUMMARY OF THE INVENTION

In accordance with one embodiment of the present invention, it is an object of the present invention to provide an improved combined cycle system having as a top stage a fuel cell, a partial oxidation reactor, or a heat engine, and an oxygen-enriching device as a second stage and method therefor.

It is another object of the present invention to provide an improved combined cycle system and method that will have a bottom stage that, in combination with the top stage, provides considerably more efficiency than current apparatus and methods employing pressure swing adsorption or air liquefaction and fractional distillation to concentrate oxygen, thereby making it more fuel efficient to run the top stage (i.e. a fuel cell, a partial oxidation reactor or a heat engine) on an oxygen-enriched gas mixture.

BRIEF DESCRIPTION OF THE PREFERRED EMBODIMENTS

In accordance with one embodiment of the present invention, a combined cycle oxygen-enriched fuel cell, partial oxidation reactor or heat engine system is disclosed. The combined cycle system is comprised of a fuel cell, partial oxidation reactor or heat engine as a top stage. An oxygen-enriching device means bottom stage is coupled to the top stage such that waste heat generated by the top stage is transferred to the oxygen-enriching device means. The oxygen-enriching device means uses the waste heat from the top stage to produce an oxygen-enriched gas mixture. The oxygen-enriched gas mixture, as output of the bottom stage, is fed back to an input of the top stage. This combined cycle raises the efficiency and reduces the size of the combined cycle system, since the top stage is running on a more concentrated supply of oxygen.

In accordance with another embodiment of the present invention, a method of providing an improved combined cycle comprising a fuel cell, a partial oxidation reactor or heat engine is disclosed. The method comprises the steps of: providing a fuel cell, a partial oxidation reactor or heat engine as a top stage; and providing an oxygen-enriching device means as a bottom stage which is coupled to the top stage such that heat generated by top stage is transferred to the oxygen-enriching device means to produce an oxygen-enriched gas mixture for the top stage. The oxygen-enriched gas mixture of the bottom stage is fed back as an input to the top stage.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
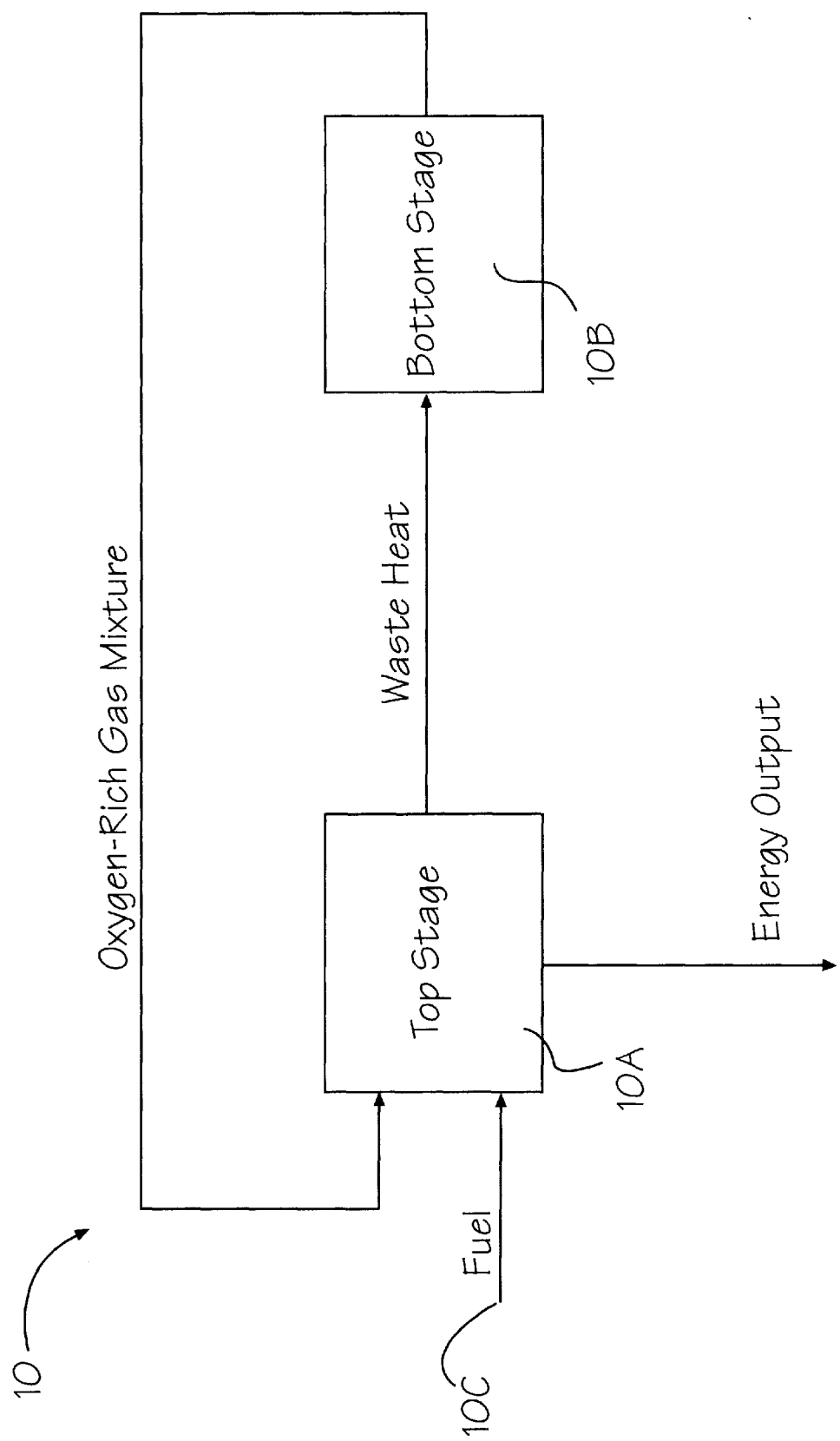
FIG. 1 is a simplified schematic diagram showing the combined cycle system of the present invention.

Referring to FIG. 1, a combined cycle system 10 (hereinafter combined cycle system 10) of enhanced efficiency is shown. The combined cycle system 10 is comprised of a top stage 10A and a bottom stage 10B. The designation top stage 10A and bottom stage 10B does not reflect the actual physical location of the stages, but rather are terms, well known to those skilled in the art, that are used to describe the functions of the combined cycle.

The bottom stage 10B of the combined cycle system 10 is comprised of an oxygen-enriching device that uses heat to enrich the oxygen content of the air. In the preferred embodiment of the invention, the oxygen-enriching device bottom stage 10B should produce an oxygen-enriched gas mixture comprising about 30% to 90% oxygen. Some examples of an oxygen-enriching device which uses heat to produce an oxygen-enriched gas mixture are a temperature swing adsorption device and a chemical reaction bed device using a lead oxide (PbO) based reactant or a silver (Ag) based reactant. The top stage 10A of the combined cycle system 10 is comprised of a fuel cell, a partial oxidation reactor, or a heat engine.

An output of the bottom stage 10B is coupled to an input of the top stage 10A to provide the top stage 10A with an oxygen-enriched gas mixture. By running the top stage 10A of the combined cycle system 10 on an oxygen-enriched gas mixture instead of air, the efficiency, size and cost of the top stage 10A will all improve. Furthermore, a top stage 10A running on an oxygen-enriched gas mixture instead of air would also generate less pollution.

A fuel source 10C is also inputted to the top stage 10A of the combined cycle system 10. The fuel source 10C and oxygen-enriched gas mixture are combined and reacted to produce an energy output from the top stage 10A. An output from the top stage 10A is further coupled to the bottom stage 10B. The output from the top stage 10A transfers waste heat generated during the reaction of the oxygen-enriched gas and the fuel source 10C to the bottom stage 10B. The bottom stage 10B uses the waste heat from the top stage 10A to produce the oxygen-enriched gas mixture thereby forming the combined cycle system 10.

Figure 2:
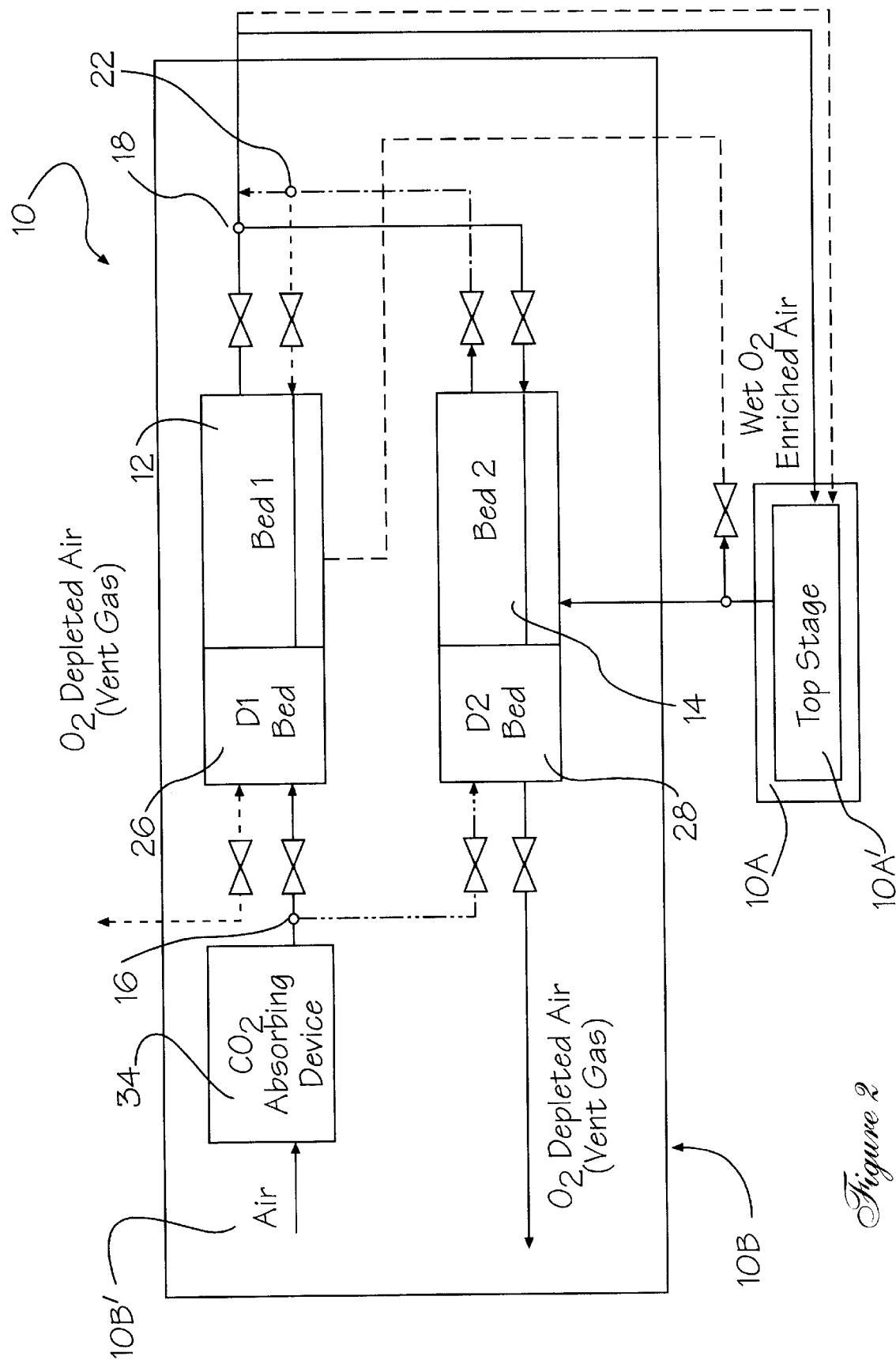
FIG. 2 shows one embodiment of the combined cycle system having a temperature swing adsorption device as the bottom stage.

Combined Cycle System Having a Temperature Swing Adsorption Device Bottom Stage Referring to FIG. 2, wherein like numerals and symbols designate like elements, one embodiment of the combined cycle system 10 is shown. According to this embodiment, the bottom stage 10B of the combined cycle system 10 is comprised of an oxygen-enriching temperature swing adsorption device 10B' (hereinafter device 10B') and the top stage 10A is a fuel cell or partial oxidation reactor or heat engine 10A'. The solid lines depict the flow of the combined cycle system 10 when a first adsorption bed 12 of the device 10B' generates an oxygen-enriched mixture of $O_2$ and $N_2$ for the oxygen-consuming device 10A'. When the first adsorption bed 12 is generating an oxygen-enriched mixture of $O_2$ and $N_2$, the second adsorption bed 14 of the system 10B' is being stripped of nitrogen which has been adsorbed by the second adsorption bed 14. The broken lines depict the flow of the device 10 when the roles of the first adsorption bed 12 and the second adsorption bed 14 are reversed.

In operation, the inputted air to the device 10B' is first passed through a standard carbon dioxide-absorbing device 34. The carbon dioxide-absorbing device 34 protects the first adsorption bed 12 and the second adsorption bed 14 from carbon dioxide poisoning. The inputted air is then passed through a first desiccant bed 26, which is coupled to the carbon dioxide adsorbing device 34, to a first adsorption bed 12. The first adsorption bed 12 is capable of removing nitrogen from the air to produce an oxygen-enriched mixture of $O_2$ and $N_2$ (typically 40% or more oxygen). A second desiccant bed 28 is also coupled to the carbon dioxide-absorbing device 34. When the first adsorption bed 12 is saturated with nitrogen and is no longer capable of effectively removing nitrogen from the air, the inputted air is sent through a second desiccant bed 28 to a second adsorption bed 14. The second adsorption bed 14 receives the inputted air and removes nitrogen from the air to produce the oxygen-enriched mixture of $O_2$ and $N_2$ (typically 40% or more oxygen). In its preferred embodiment, the first adsorption bed 12 and the second adsorption bed 14 are comprised of a packed bed of molecular sieve particles, preferably zeolitic molecular sieve particles.

Valve means 16 are coupled to an output of the carbon dioxide-absorbing device 34 to divert the inputted air to the first adsorption bed 12 or the second adsorption bed 14 depending on what adsorption bed is actively removing nitrogen from the inputted air and which adsorption bed is being regenerated. The length of time the first adsorption bed 12 or the second adsorption bed 14 is capable of effectively removing nitrogen from the air depends on the flow rate of the inputted air and on the size of the adsorption bed.

An output of the first adsorption bed 12 is coupled to the top stage 10A'. When the first adsorption bed 12 is producing the oxygen-enriched mixture, the oxygen-enriched mixture from the first adsorption bed 12 is sent to the top stage 10A'. The oxygen-enriched mixture constitutes a superior oxidant for the top stage 10A, thus enhancing the energy conversion efficiency of the combined cycle system 10 as compared to that of ordinary fuel cells or ordinary heat engines which use unenriched air as their oxidant input. Similarly, an output of the second adsorption bed 14 is coupled to the top stage 10A'.

When the first adsorption bed 12 becomes saturated with nitrogen, the second adsorption bed 14 begins to produce the oxygen-enriched mixture of $O_2$ and $N_2$. The oxygen-enriched mixture from the second adsorption bed 14 is sent to the oxygen-consuming device 10A' while the first adsorption bed 12 is being stripped of nitrogen. Thus, the top stage 10A' is always being supplied with an oxygen-enriched mixture of $O_2$ and $N_2$.

Operation of the Combined Cycle System Having a Temperature Swing Adsorption Device Bottom Stage In operation, when the first adsorption bed 12 is producing an oxygen-enriched mixture of $O_2$ and $N_2$, the second adsorption bed 14 is saturated with nitrogen and must be stripped of the adsorbed nitrogen in order for the system 10 to be able to produce a continuous flow of the oxygen-enriched mixture of $O_2$ and $N_2$ for the oxygen consuming device 10A'. The process of removing the absorbed nitrogen from the first adsorption bed 12 or the second adsorption bed 14 is called regeneration.

During one example of the regeneration process of the second adsorption bed 14, valve means 18 diverts a portion of the outputted oxygen-enriched mixture of $O_2$ and $N_2$ from the first adsorption bed 12 (typically as much as 60%) to the second adsorption bed 14. The oxygen-enriched mixture of $O_2$ and $N_2$ strips the adsorbed nitrogen from the second adsorption bed 14 which is also heated during the regeneration process. The heat used to heat the second adsorption bed 14 is waste heat which is produced by the top stage 10A' which is coupled to the second adsorption bed 14. The waste heat from the top stage 10A' must be able to heat the second adsorption bed 14 to a temperature of about 60° C. or higher, and preferably 80° C. or higher. During the heating of the second adsorption bed 14, the second adsorption bed 14 is open to the atmosphere. Most of the trapped nitrogen is thereby expelled from the second adsorption bed 14 and is either discarded to the atmosphere or collected and used as a purging agent for another system which may require a purging gas. It should be noted that during the regeneration process, the waste heat from the oxygen-consuming device 10A' may be used to heat the second adsorption bed 14 directly, or the waste heat may be used to heat the oxygen-enriched mixture of $O_2$ and $N_2$ which can be used to strip the adsorbed nitrogen from the second adsorption bed 14.

After the second adsorption bed 14 has been stripped clean of the nitrogen which it had previously adsorbed while acting as an oxygen enricher, the second adsorption bed 14 is cooled down to near ambient temperature. The second adsorption bed 14 may be cooled by circulating either a portion of the oxygen-enriched gas mixture, air, or any other suitable fluid (a liquid or a gas) that does not interact adversely with the second adsorption bed 14. The pressure in the second adsorption bed 14 is kept constant by injecting via a check valve (not shown) appropriate amounts of the oxygen-enriched mixture or air into the second adsorption bed 14 to fill the partial vacuum produced as the second adsorption bed 14 cools down to an ambient temperature.

When the second adsorption bed 14 has reached a temperature close to ambient, the second adsorption bed 14 is closed and, if a liquid was used to cool down the second adsorption bed 14, the excess liquid is drained from the second adsorption bed 14. The regeneration of the second adsorption bed 14 is now complete and the second adsorption bed 14 may now begin to produce an oxygen-enriched mixture of $O_2$ and $N_2$ once again. Meanwhile, the first adsorption bed 12 has now become loaded with nitrogen and is ready for regeneration in the same manner described above for the second adsorption bed 14.

The molecular sieve material used by the first adsorption bed 12 and the second adsorption bed 14 is of a type that is capable of adsorbing nitrogen at low temperatures and releasing the nitrogen at a higher temperature. This type of material has a tendency to become deactivated by moisture. Therefore, it may be necessary to remove the moisture from the incoming air. A first desiccant bed 26 is coupled to the first adsorption bed 12 to remove any moisture from the air prior to the air being blown into the first adsorption bed 12. Similarly, a second desiccant bed 28 is coupled to the second adsorption bed 14 to remove any moisture from the air prior to the air being blown into the second adsorption bed 14.

Both desiccant beds 26 and 28 are periodically stripped of adsorbed water by the use of heat applied to and conveyed by a portion of the dry mixtures of nitrogen and oxygen exiting from the first adsorption bed 12 and the second adsorption bed 14 and used for regeneration. When the first adsorption bed 12 is being regenerated, a portion of the oxygen-enriched mixture of $O_2$ and $N_2$ is diverted from the output of the second adsorption bed 14 via valve means 22 to the first adsorption bed 12. Likewise, during the regeneration of the second adsorption bed 14, a portion of the oxygen-enriched mixture of $O_2$ and $N_2$ is diverted from the output of the first adsorption bed 12 via a valve means 18 to the second adsorption bed 14. The heat can come from the oxygen-consuming device 10A' coupled to the system 10B' if the waste heat is hot enough, as in the case of a partial oxidation device or an engine exhaust; or by burning a small amount of fuel, if the waste heat is not hot enough, as in the case of a fuel cell.

Periodically, the carbon dioxide-absorbing device 34 also needs to be regenerated in order to remove the absorbed carbon dioxide. Typically, heat is used in the regeneration process of the carbon dioxide-absorbing device 34. Such heat can come from the oxygen-consuming device 10A' which is coupled to the bottom stage 10B if the waste heat is hot enough, as in the case of a partial oxidation device or an engine exhaust; or by burning a small amount of fuel, if the waste heat is not hot enough, as in the case of a fuel cell.

Combined Cycle System Having a Chemical
Reaction Bed Device Bottom Stage

Figure 3:
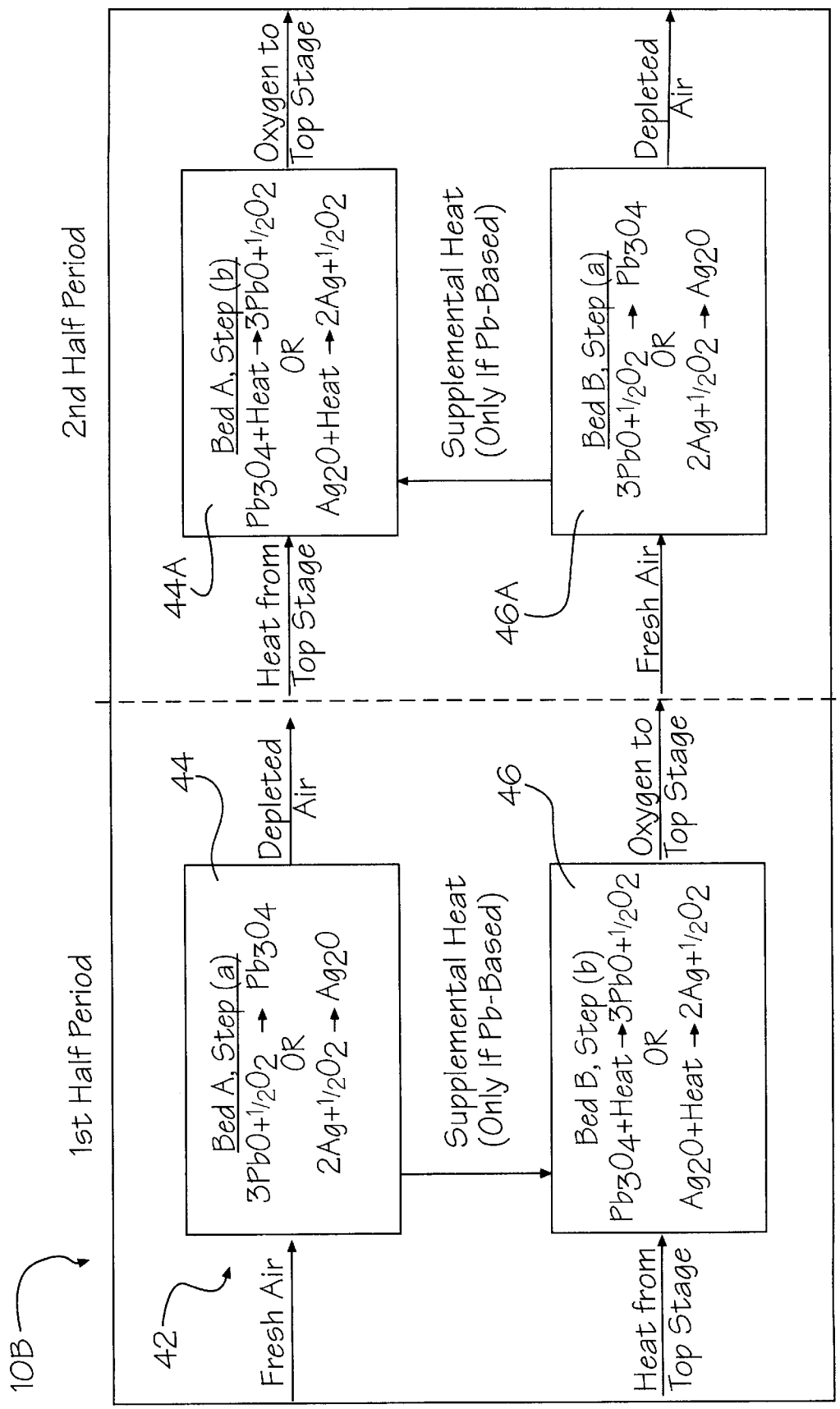
FIG. 3 shows another embodiment of the combined cycle system having a chemical-based reaction bed device as the bottom stage.

Referring to FIG. 3, wherein like numerals and symbols designate like elements, another embodiment of the bottom stage 10B is shown. In this embodiment, the bottom stage 10B is comprised of a chemical reaction system 40. The chemical reaction system is comprised of a chemical reactor 42 having a first reactor bed 44 and a second reactor bed 46 coupled to the first reactor bed 44. When air is inputted into the first reactor bed 44, the air reacts with the lead oxide (PbO) inside the reactor bed 44A to yield $Pb_3O_4$ and heat:

$$\tfrac{1}{2}O_2 + 3PbO \rightarrow Pb_3O_4 + \text{Heat}$$

During the second stage of the process, waste heat from the oxygen-consuming energy converting device top stage of the combined cycle system is then used to decompose the $Pb_3O_4$ in the first reactor bed (now reactor bed 44A in FIG. 3) yielding oxygen and PbO:

$$Pb_3O_4 + \text{Heat} \rightarrow 3PbO + \tfrac{1}{2}O_2$$

The oxygen produced is then inputted to the top stage of the combined cycle system.

The heat generated when the inputted air reacted with the lead oxide (PbO) inside the reactor bed 44 is conveyed by conventional heat exchange techniques to the second reactor bed 46. The second reactor bed 46 is identical to the first reactor bed 44 but out of phase with the first reactor bed 44. The first reactor bed 44 thus sends supplemental heat to the second reactor bed 46 when the $Pb_3O_4$ of the second reactor bed 46 is being thermally decomposed to yield oxygen and PbO. Likewise, during the second stage of the process, the second reactor bed 46A sends supplemental heat to the first reactor bed 44A when the PbO in the second bed is being oxidized while the $Pb_3O_4$ in the first reactor bed is being thermally decomposed. Since an output from the first and second reactor beds 44A, 46 are both coupled to an input of the top stage of the combined cycle system, oxygen is continuously being fed to the top stage.

The same concept can be carried out with a silver based reaction. The silver in the first or second reactor bed 44, 46 reacts with the inputted air to form $Ag_2O$:

$$2Ag + \tfrac{1}{2}O_2 \rightarrow Ag_2O$$

Waste heat from the top stage of the combined cycle then reacts with the $Ag_2O$ to produce oxygen and silver:

$$Ag_2O + \text{Heat} \rightarrow 2Ag + \tfrac{1}{2}O_2$$

The silver based sequence is essentially the same as the lead based reaction with the cycle continuously repeating itself except, that in the case of the silver based reaction, little or no heat is generated in the initial reaction with the inputted air and the silver.

While the invention has been particularly shown and described with reference to preferred embodiments thereof, it will be understood by those skilled in the art that the foregoing and other changes in form and details may be made therein without departing from the spirit and scope of the invention. For example, more than two adsorption beds may be used in the apparatus.

Having thus described the invention, what is desired to be protected by Letters Patent is presented in the subsequently appended claims.

What is claimed is:

1. A combined cycle system, comprising:

a top stage including a fuel cell that has oxygen as one of its reactants, and which produces heat as one of its reaction by-product outputs; and a bottom stage including a non-cryogenic oxygen-enriching means coupled to said top stage, said bottom stage receiving said heat by-product output of said fuel cell of said top stage, said heat by-product output being consumed by said bottom stage to produce an oxygen-enriched gas mixture output that is fed to said fuel cell of said top stage as a reactant input for said fuel cell of said top stage for reactive use therein.

2. A combined cycle system, comprising:

a top stage including a partial oxidation reactor that has oxygen as one of its reactants, and which produces heat as one of its reaction by-product outputs; and a bottom stage including a non-cryogenic oxygen-enriching means coupled to said top stage, said bottom stage receiving said heat by-product output of said partial oxidation reactor of said top stage, said heat by-product output being consumed by said bottom stage to produce an oxygen-enriched gas mixture output that is fed to said partial oxidation reactor of said top stage as a reactant input for said partial oxidation reactor of said top stage for reactive use therein.

3. A combined cycle system, comprising:

a top stage including a heat engine that has oxygen as one of its reactants, and which produces heat as one of its reaction by-product outputs; and a bottom stage including a non-cryogenic oxygen-enriching means coupled to said top stage, said bottom stage receiving said heat by-product output of said heat engine of said top stage, said heat by-product output being consumed by said bottom stage to produce an oxygen-enriched gas mixture output that is fed to said heat engine of said top stage as a reactant input for said heat engine of said top stage for reactive use therein.

4. The combined cycle system in accordance with claims 1, 2, or 3, wherein said non-cryogenic oxygen-enriching means comprises a temperature-swing adsorption device.

5. The combined cycle system in accordance with claim 4, wherein said temperature-swing adsorption device further includes:

a first adsorption bed having input means and output means, said first adsorption bed receiving air and having removal means for removing nitrogen from said received air to produce said oxygen-enriched mixture of oxygen and nitrogen;

a second adsorption bed coupled to said first adsorption bed, said second adsorption bed having input means and output means, said second adsorption bed receiving air and removing said nitrogen from said received air to produce said oxygen-enriched mixture, when said first adsorption bed is saturated with nitrogen;

a first diverting means coupled to said input means of said first adsorption bed for diverting said air to said second adsorption bed, when said first adsorption bed becomes saturated with nitrogen, and for diverting air to said first adsorption bed after said second adsorption bed becomes saturated with nitrogen and after said nitrogen has been removed from said first adsorption bed;

a first heating means coupled to said first adsorption bed for heating said first adsorption bed in order to assist in removal of said nitrogen from said first adsorption bed, when said first adsorption bed is saturated with said nitrogen;

a second diverting means coupled to said output means of said second adsorption bed for diverting at least a portion of said oxygen-enriched mixture to said first adsorption bed to strip nitrogen from said first adsorption bed, when said first adsorption bed is saturated with nitrogen;

a second heating means coupled to said second adsorption bed for heating said second adsorption bed in order to assist in removal of nitrogen from said second adsorption bed, when said second adsorption bed is saturated with nitrogen; and a third diverting means coupled to said output means of said first adsorption bed for diverting at least a portion of said oxygen-enriched mixture to said second adsorption bed, when said second adsorption bed is saturated with nitrogen.

6. The combined cycle system in accordance with claim 5, wherein said first adsorption bed means comprises a zeolitic molecular sieve bed.

7. The combined cycle system in accordance with claim 5, wherein said second adsorption bed means comprises a zeolitic molecular sieve bed.

8. The combined cycle system in accordance with claim 5, wherein said first heating means for said first adsorption bed means uses waste heat generated by said top stage of the combined cycle system.

9. The combined cycle system in accordance with claim 5, wherein said second heating means for said second adsorption bed means uses waste heat generated by said top stage of the combined cycle system.

10. The combined cycle system in accordance with claim 5, further comprising a first desiccant bed coupled to said input of said first adsorption bed for removing moisture from the air.

11. The combined cycle system in accordance with claim 5, further comprising a second desiccant bed coupled to said input of said second adsorption bed for removing moisture from the air.

12. The combined cycle system in accordance with claim 5, further comprising a carbon dioxide adsorption means for removing carbon dioxide from the air prior to its being fed to said first and said second respective adsorption beds.

13. The combined cycle system in accordance with claim 4, wherein said oxygen-enriching produces an oxygen-enriched gas mixture having an oxygen content in an approximate range of between thirty to ninety percent by weight.

14. The combined cycle system in accordance with claims 1, 2, or 3, wherein said oxygen-enriching produces an oxygen-enriched gas mixture having an oxygen content in an approximate range of between thirty to ninety percent by weight.

15. The combined cycle system in accordance with claims 1, 2 or 3, wherein said oxygen-enriching means comprises a chemical reactor bed.

16. The combined cycle system in accordance with claim 15, wherein said chemical reactor bed comprises at least one reactor bed coupled to said top stage and having a chemical agent that reacts with air, and then with heat produced by said top stage to produce an oxygen-enriched gas mixture which is fed back to said top stage.

17. The combined cycle system in accordance with claim 16, wherein said chemical agent is selected from a group of agents consisting of lead oxide, silver and combinations thereof.

18. The combined cycle system in accordance with claim 15, wherein said chemical reactor bed comprises:

a first reactor bed coupled to said top stage for receiving air, said received air reacting with a chemical agent in said first reactor bed and then being heated by heat produced by said top stage to produce an oxygen-enriched gas mixture in said bottom stage which is fed to said top stage; and a second reactor bed means coupled to said top stage for receiving air when said first reactor bed is heated by said top stage, said received air reacting with a chemical agent in said second reactor bed and then being heated by heat produced by said top stage to produce an oxygen-enriched gas mixture in said bottom stage which is fed to said top stage, thereby providing said top stage with a continuous flow of the oxygen-enriched gas mixture.

19. The combined cycle system in accordance with claim 18, wherein said chemical agent is selected from a group of agents consisting of lead oxide, silver and combinations thereof.

* * * * *